US005341655A

United States Patent [19]

Al-Saleh

[11] Patent Number: 5,341,655

[45] Date of Patent: Aug. 30, 1994

[54] SALT FREE EVAPORATIVE AIR CONDITIONING

[76] Inventor: Abdul A. A. Al-Saleh, P.O. Box 21952, Riyadh 11485, Saudi Arabia

[21] Appl. No.: 966,814

[22] Filed: Oct. 26, 1992

[51] Int. Cl.5 .................... B01F 3/04

[52] U.S. Cl. .................... 62/304; 62/121; 261/DIG. 46

[58] Field of Search .............. 62/304, 121, 122, 235.1; 261/27, DIG. 3, DIG. 46, DIG. 49

[56] References Cited

U.S. PATENT DOCUMENTS

| | | | |
|---|---|---|---|
| 948,880 | 2/1910 | Hass et al. | 62/304 |
| 2,413,138 | 12/1946 | Feinberg | 261/DIG. 46 |
| 3,991,938 | 11/1976 | Ramey | 62/235.1 |
| 4,172,767 | 10/1979 | Sear | 261/DIG. 79 |
| 4,188,994 | 2/1980 | Hinshaw | 165/61 |
| 4,369,148 | 1/1983 | Hawkins | 261/36 R |
| 4,389,351 | 6/1984 | O'Brien | 261/36 R |
| 4,657,709 | 4/1987 | Goettl | 261/3 |

*Primary Examiner*—Henry A. Bennett
*Assistant Examiner*—William C. Doerrler
*Attorney, Agent, or Firm*—David M. Klein

[57] ABSTRACT

An air conditioner is provided that self-disposes of salts that accumulate in increasing concentration inside the air conditioner cooler. Such salts result from continuous evaporation of water that cools air passing through water evaporation mats located within the cooler. The air conditioner includes a separate basin for drawing salty water from the cooler reservoir. Drawn water is evaporated from the basin to concentrate the salt for disposal. The evaporation basin is designed so that the evaporation rate therein is substantially equal to a predetermined ideal quantity of salt water to be disposed of in order to maintain the highest efficiency in performance of the cooler. As such, the evaporative air conditioner system does not consume a larger quantity of water than that consumed by ordinary coolers that require regular cleaning and maintenance.

18 Claims, 8 Drawing Sheets

1
2
3
4
5
6
7
7
8

SALT FREE EVAPORATIVE AIR CONDITIONING

FIELD OF THE INVENTION

This invention relates to an air conditioner that self-disposes of salts that accumulate in increasing concentration inside the air conditioner cooler. Such salts result from continuous evaporation of water that cools air passing through water evaporation mats located within the cooler.

BACKGROUND

In the case of a one half horsepower capacity cooler, the water consumption exceeds 15 liters per hour. In such water evaporative cooling systems, large quantities of salts may accumulate due to the evaporation of water all through the working hours of the cooler. The cooling efficiency of the cooler declines due to the increased concentration of salts which form solid salt crystals that spread and multiply from inside to outside the cooler. The accumulated salt plugs air openings and damages the water evaporation mat (which is typically made of straw). This necessitates frequent changing of the water evaporation mats. The salts also contribute to rapid corrosion of the cooler frame and its metallic parts and generates offensive odors.

In order to avoid the harmful effect of the salts and in order to maintain the air conditioner cooler capacity, the cooling water must be changed regularly based upon the cooler's hours of operation, typically every month. This is accomplished by decanting salty water from the cooler reservoir and refilling same with fresh water from a flow control spigot. Typically, ordinary tap water is used. It is difficult to remember to do this job in the recommended time interval. Also it is difficult to perform this task when the cooler is mounted in a high location such as a facade or upper surface of a building.

Therefore, most of the air conditioner salty water might not be changed until it looses its cooling capability and damages the evaporation mat. Once this occurs, a thorough cleaning must be carried out together with replacement of the mat and other maintenance which is necessitated by the salt's harmful effect on the cooler frame and metallic parts.

These draw backs are unfortunate because evaporate air conditioners consume less electric power than other types of air conditioners. The need for frequent maintenance and cleaning due to salt build up in evaporative air conditioner systems has been a limiting factor in the commercial acceptance.

SUMMARY OF THE. INVENTION

It has now been found that it is possible to alleviate the salt accumulation problem in evaporative air conditioners by providing a mechanism for disposing of the salt in an easier and systemized manner. Salt disposal in accordance with the invention maintains cooler efficiency of the evaporative air conditioner, reduces the required maintenance and extends the useful life of the equipment without any significant increase in cost. In accordance with the invention, the cooler of the evaporative air conditioner includes a basin for drawing salty water. This basin is typically located over the roof of the cooler, wherein the salty water evaporates naturally by exposure to sun and air. The basin is designed to fill itself with salty water all at once when most of its water dries, e.g. in 1 or 2 week intervals. In this way, the salts accumulate and concentrate in the basin remote from the cooler and therefore concentration and sedimentation of salts is removed from inside to outside the cooler, solely within the evaporation basin.

Accordingly, the use of the evaporation basin allows for continuous and regular disposal of salts, the concentration of which would otherwise continuously increase inside the cooler. The evaporation basin is designed so that the evaporation rate therein is substantially equal to a pre-determined ideal quantity of salty water to be disposed of in order to maintain the highest efficiency and performance of the cooler. As such, the evaporative air conditioner system in accordance with the invention does not consume a larger quantity of water than that consumed by ordinary coolers that require regular cleaning and maintenance.

The evaporation basin is designed for easy disengagement and installation which facilitates removal of the accumulated salts on an infrequent basis.

Additionally, the side walls of the cooler may be extended to conceal the evaporation basin located on the cooler roof. Alternatively, the evaporation basin is designed in a complementary shape to the outside frame of the cooler. Any number of evaporation basin designs are possible provided that they meet the functional criteria described herein.

While this invention is directed towards the problem of salt concentration and sedimentation in evaporative of air conditioner systems, the concept of using an evaporation basin to remotely concentrate the salt can be applied in any situation where sedimentation and concentration of salts is a problem.

DETAILED DESCRIPTION OF THE PREFER EMBODIMENT

Figure 1:
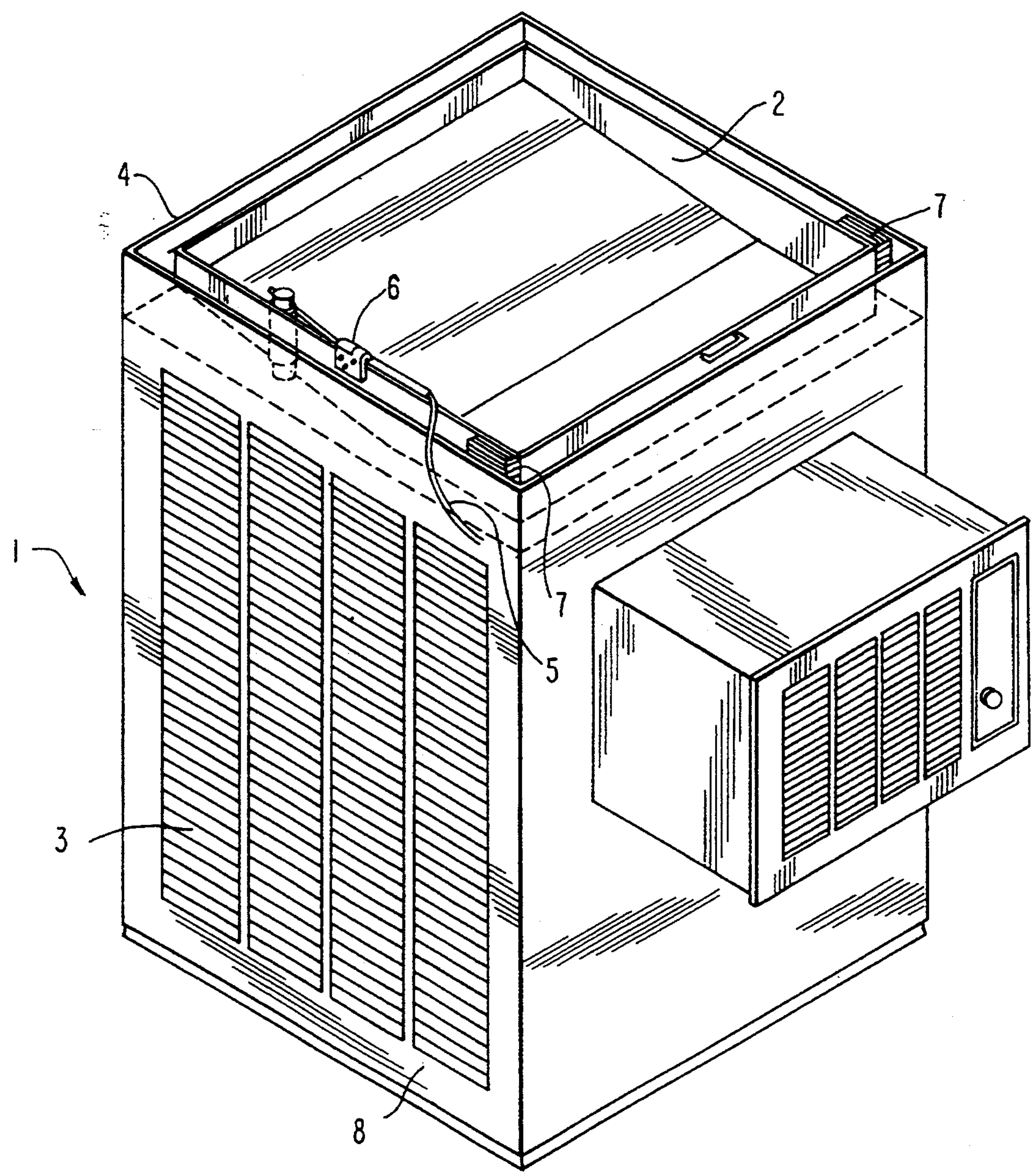
FIG. 1 is a perspective view of an evaporative air conditioner in accordance with the invention including an evaporative drying basin located on the roof thereof.

FIG. 1 shows an evaporative air conditioner 1 upon which is mounted a drying basin 2 for disposal of salt. In the case of evaporative air conditioner systems wherein salty water is to be changed regularly following a set maintenance schedule, the drying basin automatically performs this function and discontinues operation whenever the evaporative air conditioner cooler is not operating. The drying basin 2 is fed with salty water from the cooler through tube 5.

The tube is preferably made of plastic or some other corrosion-resistant material. The tube 5 branches from a tube feeding a water evaporation mat within the cooler (not shown). This in turn originates from a small water pump generally located in the bottom of the cooler (also not shown). A valve 6 located on top of the drying basin 2 controls the flow of salty water into the drying basin depending upon the basin position.

Figure 2:
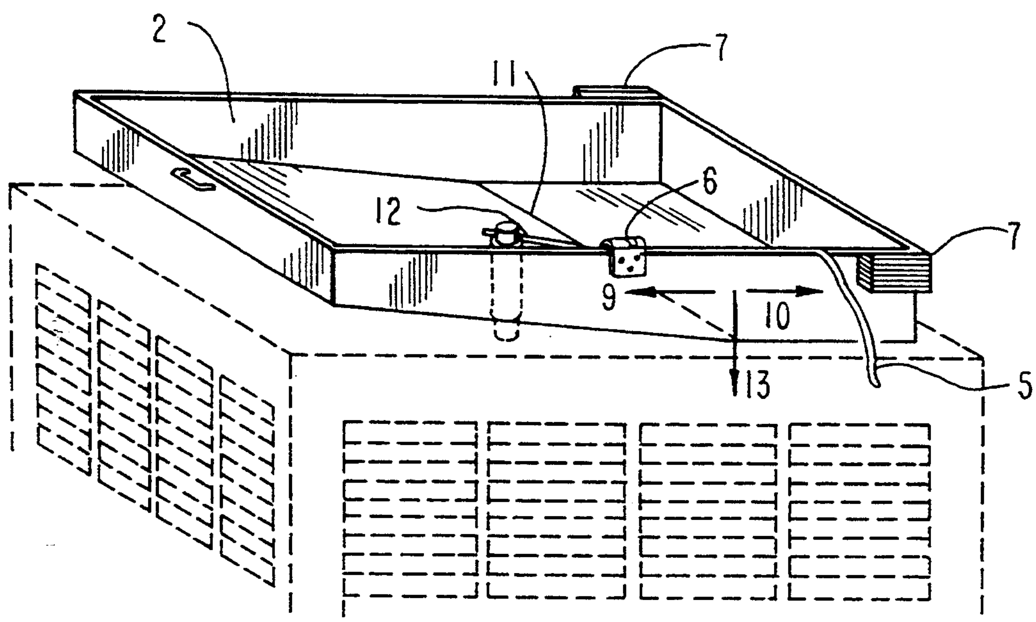
FIG. 2 is a perspective view of the evaporative drying basin illustrated in FIG. 1 showing the evaporative drying basin in a first position prior of being filled with salty water.
Figure 3:
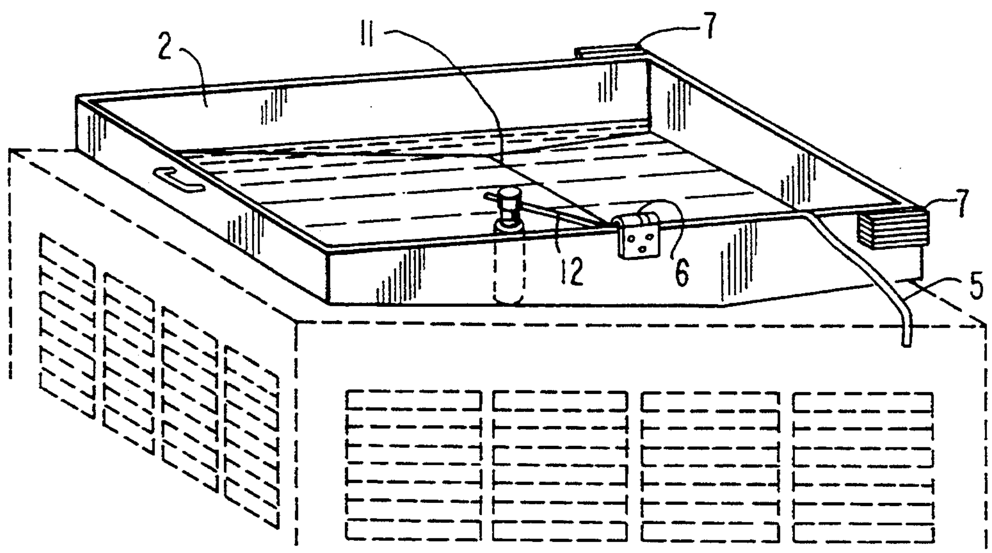
FIG. 3 is a perspective view of the evaporative drying basin of FIG. 2 showing the evaporative drying basin in a second position in which it has been filled with salty water from the cooler.
Figure 4:
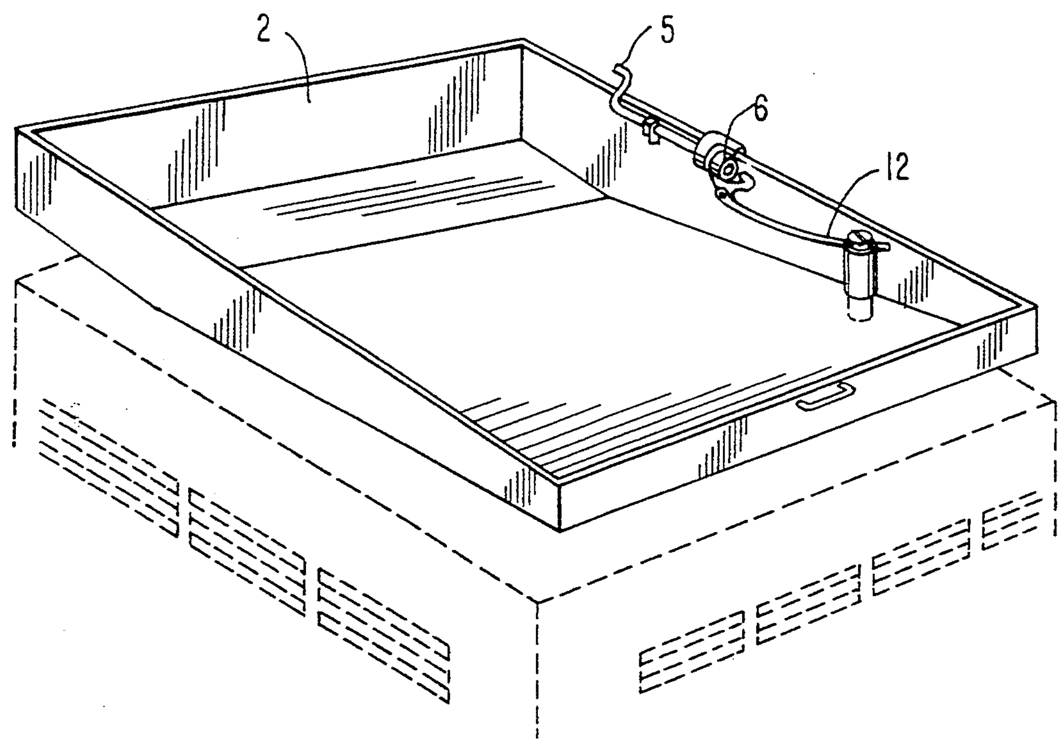
FIG. 4 is a perspective view of a valve control mechanism for controlling the flow of salty water into the evaporative drying basin, showing the flow control mechanism in an open first position.
Figure 5:
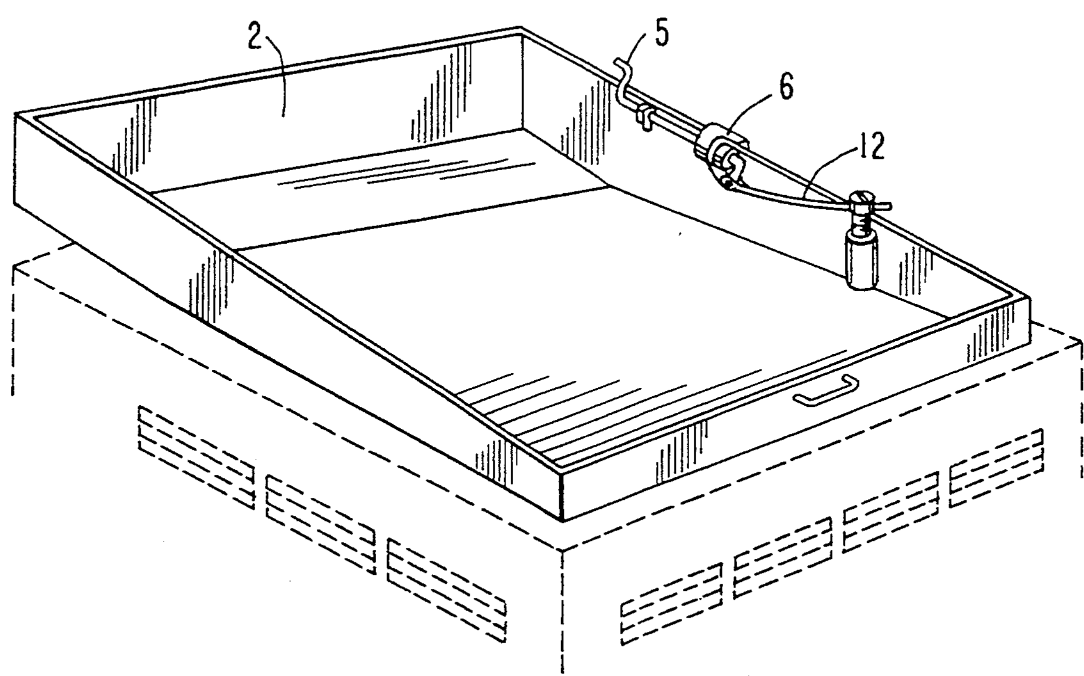
FIG. 5 shows the flow control mechanism of FIG. 4 in a closed position.

Turning to FIGS. 2 and 3, the drying basin is shown in FIG. 2 in an upright dry position and shown in FIG. 3 in a tilted filled position. The control valve 6 is not directly affected by a changing water level within the basin but rather is affected by the change of basin position between the dry and tilted position. In this manner, the drying basin is filled at one time with the salty water, then the water remains in the basin for a period of time e.g. 1 week, until most of it is dried due to natural factors (sun and air). During this period a portion of the salts concentrate in the cooling water within the cooler and need to be disposed of. At such time, the valve 6 within the drying basin 2 is opened. When the valve 6 is open, salty water from the cooler is pumped into the drying basin and fresh make up water is brought into the cooler. Typically, ordinary tap water is used for this purpose.

Each time this cycle is repeated, salts are transferred from inside the cooler to outside in the drying basin. The intermittent filling of the basin can be achieved in several ways. For example, the drying basin can be designed to change position between a full position and a dry position. The drying basin in FIG. 2 is designed in a way that more than half its ground area is sloping 5 cm upward. By using a balance weight (7), when the basin is dry, it will be in the position shown in (FIG. 2) the valve (6) controlling the basin filling will be open so that the salty water can reach the basin from the cooler through the plastic tube (5). When the basin is full of water, the center of gravity of the basin (13) moves left (9) and when it gets past the rotation axis line (11), of the basin, the basin will swing around this line to take the position in figure (3). By this movement the arm (12) of the valve is affected. This valve is somewhat similar in operation to a typical floating ball type of valve in a water closet, except that it acts through a spring-biased shaft which as seen in FIG. 3 is displaced upward only when the drying basin is in the full titled position. This raises the arm 12 which shuts the valve 6 in an otherwise conventional manner. When the water level in the basin decreases, due to its evaporation by being exposed to the sun and air within a period of one or two weeks for instance, the center of gravity of the basin moves to the right (10) until it gets past the rotation axis line (11) in which case the basin tilts to take the position shown in figure (2). By controlling the position of the rotation axis, line (11), during the designing of the basin and adjusting weight (7), it is possible to predetermine determine the quantity of water upon which the valve opens and shuts by the effect of the basin rotation around the axis (11). Also one can make different designs with more frequent additions that can realize the required objective so long as the basin will not be filled with salty water from the cooler before most of its water has dried out. One can make a basin with a rotation axis (11) the place of which can be changed, and a weight that can be moved for changing the timing of opening and shutting the valve (6). Also the above mentioned drying basin can be replaced by an ordinary stationary basin provided that one uses a water control valve of a type which does not open unless a major change happens in the basin water level. Alternatively, one can use a floating electrical switch in the ordinary basin to operate a small pump that fills the basin when a large quantity of its water evaporates but of course, this will be more costly.

In order to control the quantity of the water evaporating from the basin and the period it takes, the surface area of the basin can be changed, the larger the surface area, the greater the quantity of water evaporating from the basin. Also, the basin color will affect the quantity of evaporating water. For example, when the basin is dark tending to black, more evaporating will occur due to solar heating.

Figure 6:
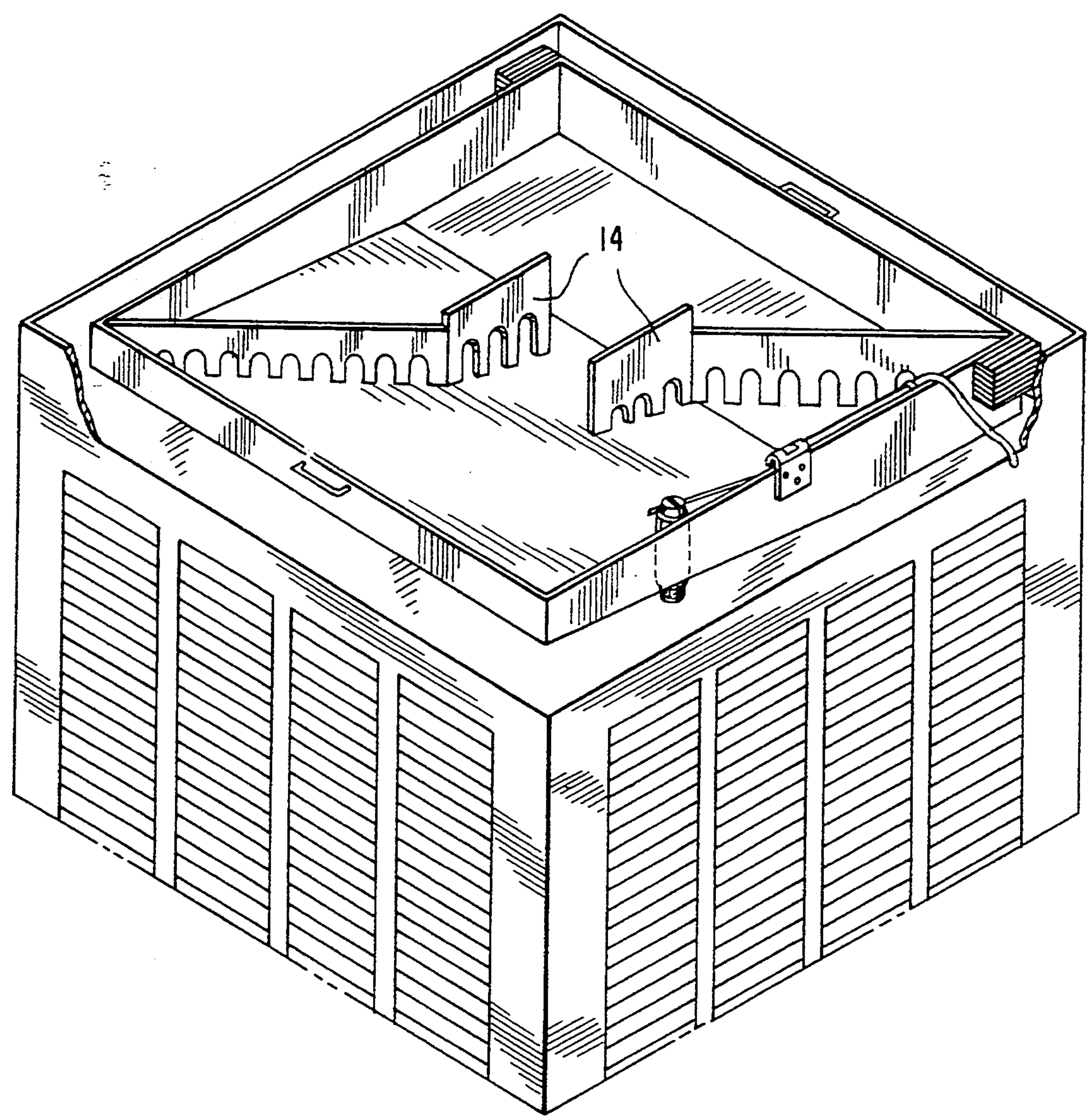
FIG. 6 is a perspective view of an alternative embodiment of the evaporative drying basin showing wind driven fins for preventing the formation of a salty peel which would otherwise interfere with the evaporation of water from the drying basin.
Figure 7A:
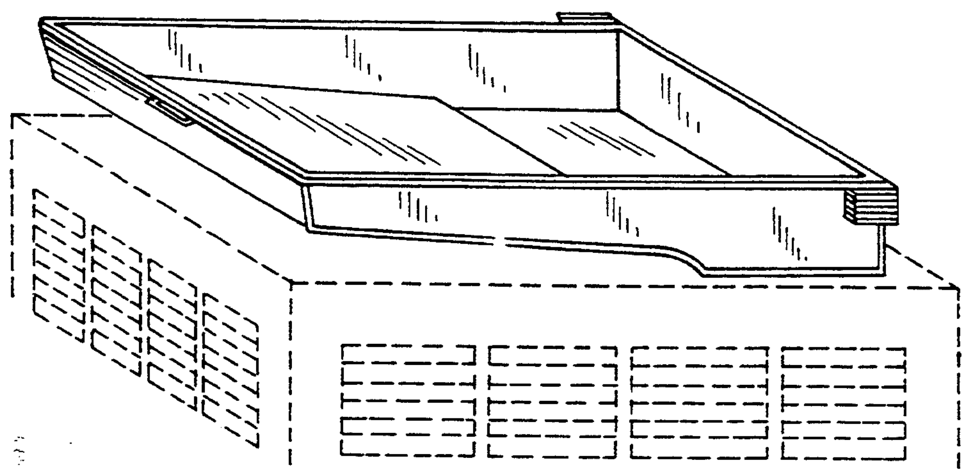
FIG. 7A–C show various alternative embodiments of the evaporative drawing basin of FIG. 2.
Figure 7B:
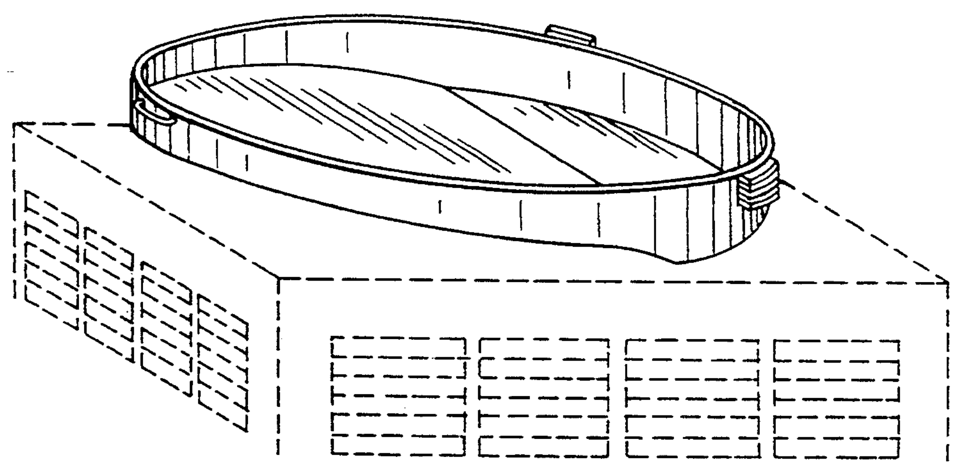
Figure 7C:
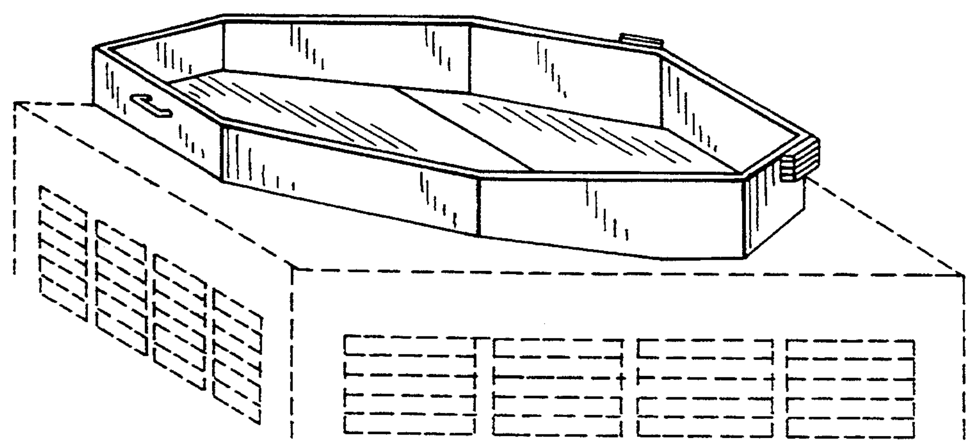

There are other external factors that affect the quantity of water evaporating from the basin which should be taken into consideration during the basin design such as the average of wind speed, average of temperature in the cooler area and relative humidity, knowing that the increase of salt concentration in the drying basin will have no great effect on the evaporation average as the difference in the quantity of vapor between drinking water and sea water is 1-3%. The effect of the increase of the salt ratio is restricted in that it might be a salt peel covering the water surface in the basin and prevents water evaporation. Preferably, this peel formation is eliminated by installing fins (14) (FIG. 6). The fins are moved by the wind in a way that, with one terminal fixed to the corner or the wall of the basin, the other is free moving and removes any peel formed. These fins may be either straight or curved in order to move even if the air blows in a direction parallel to the fins. Also, in the bottom of these fins there are openings to ease their movement within the water. Fins can, of course be designed in different forms that realize the required purpose of preventing the formation of a salty peel on the basin water surface.

In order to further illustrate the operation of the invention assume the following:

$V_r$=Volume of cooler reservoir $V_b$=Filled volume of drying basin $V_f$=Volume fraction: $V_b/V_r$ X=Total mass of dissolved salts entering the cooler reservoir per cycle $A_{max.}$=Maximum salt content in cooler reservoir reached during cycle.

$A_{min.}$=Minimum salt content in cooler reservoir reached during cycle.

The value of X depends on the concentration of salts in the make-up water multiplied by a the total amount of make-up water consumed per cycle.

The following relationships will exist when the system is at steady state.

$$A_{Max}=(1/V_f).X$$

$A_{min}=[(1-V_f)/V_f].X$

For a given system, X increases with longer cycles times. The salt concentration within the cooler $A_{max}/V_r$ preferably should be minimized to avoid corrosion and unpleasant odors. Salt concentration in the cooler reservoir can be reduced by using a larger reservoir volume $V_r$ and/or by reducing $A_{max}$. $A_{max}$ can be reduced in two ways: by decreasing the cycle time (to reduce X) or by increasing $V_f$.

Figure 8:
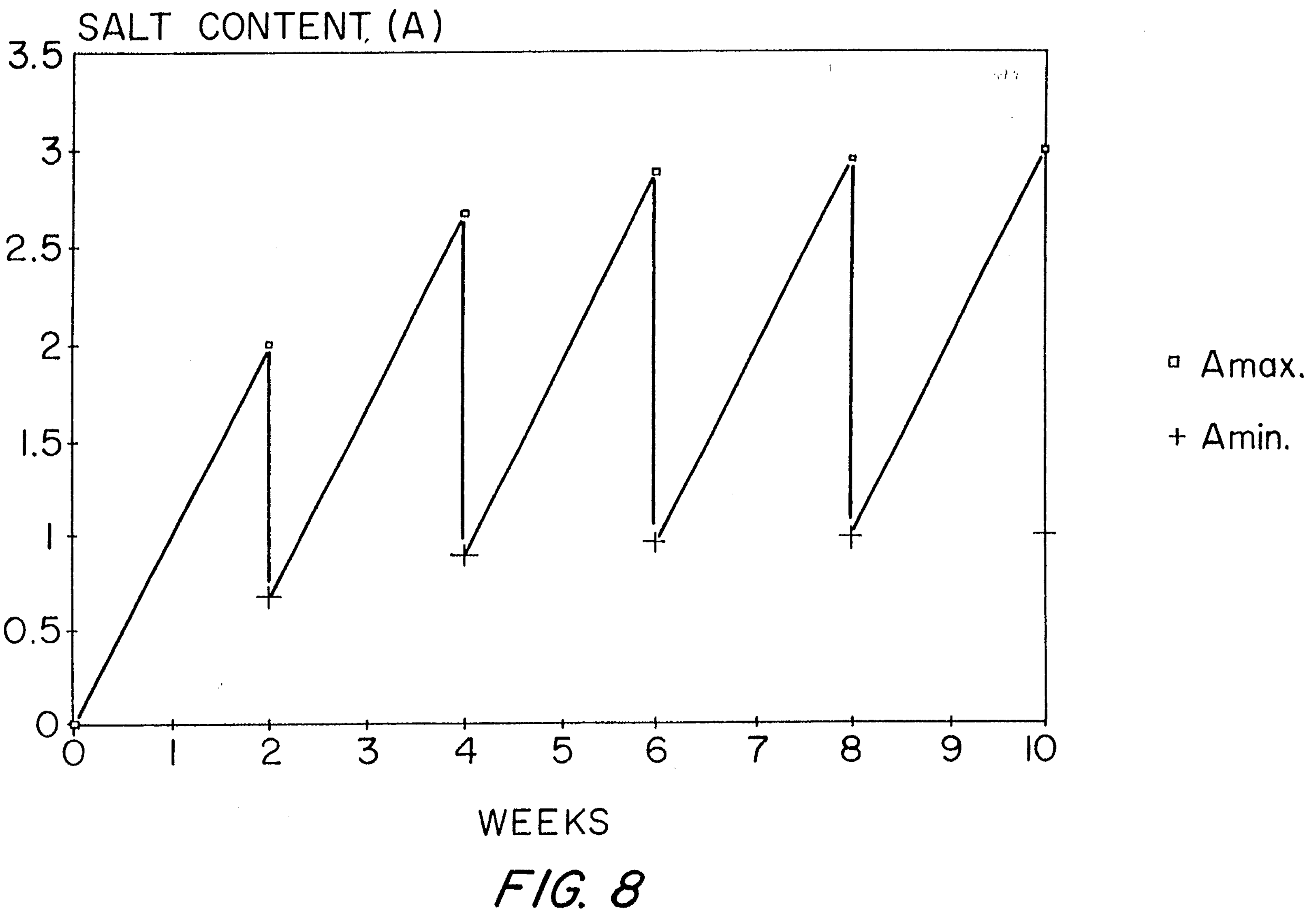
FIG. 8 is a graph showing salt content in the cooler reservoir for a two-week cycle.
Figure 9:
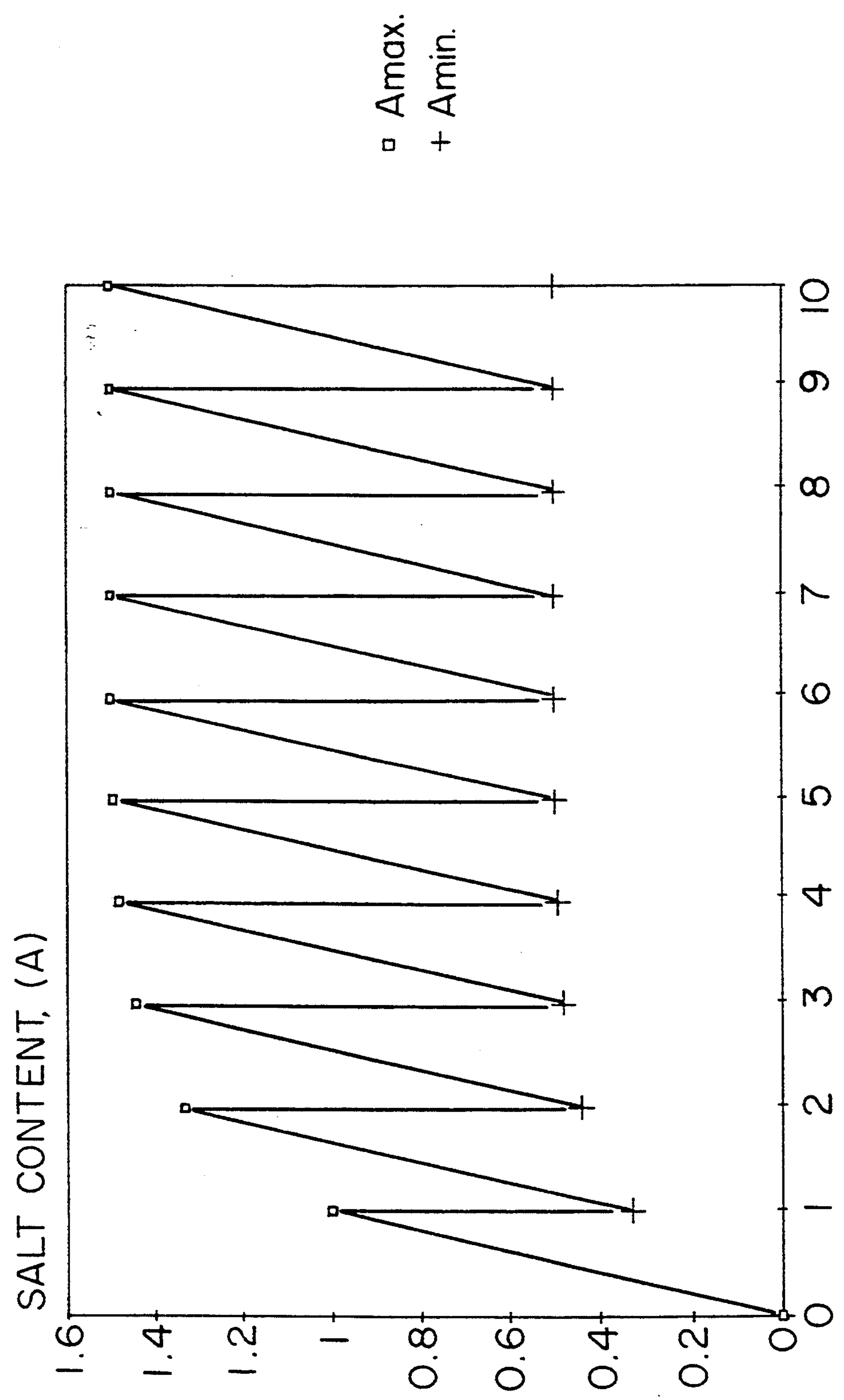
FIG. 9 is a graph showing salt content in the cooler reservoir for a one-week cycle.
Figure 10A:
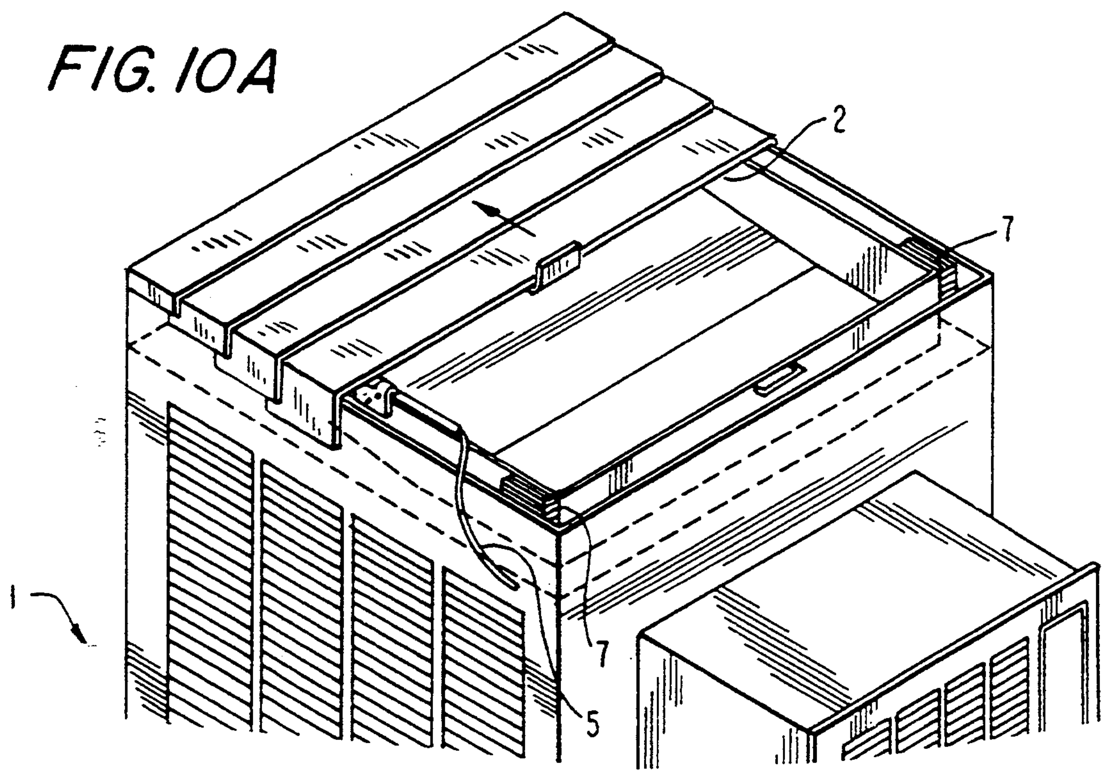
FIG. 10A shows a mobile lid mounted covering the basin.
Figure 10B:
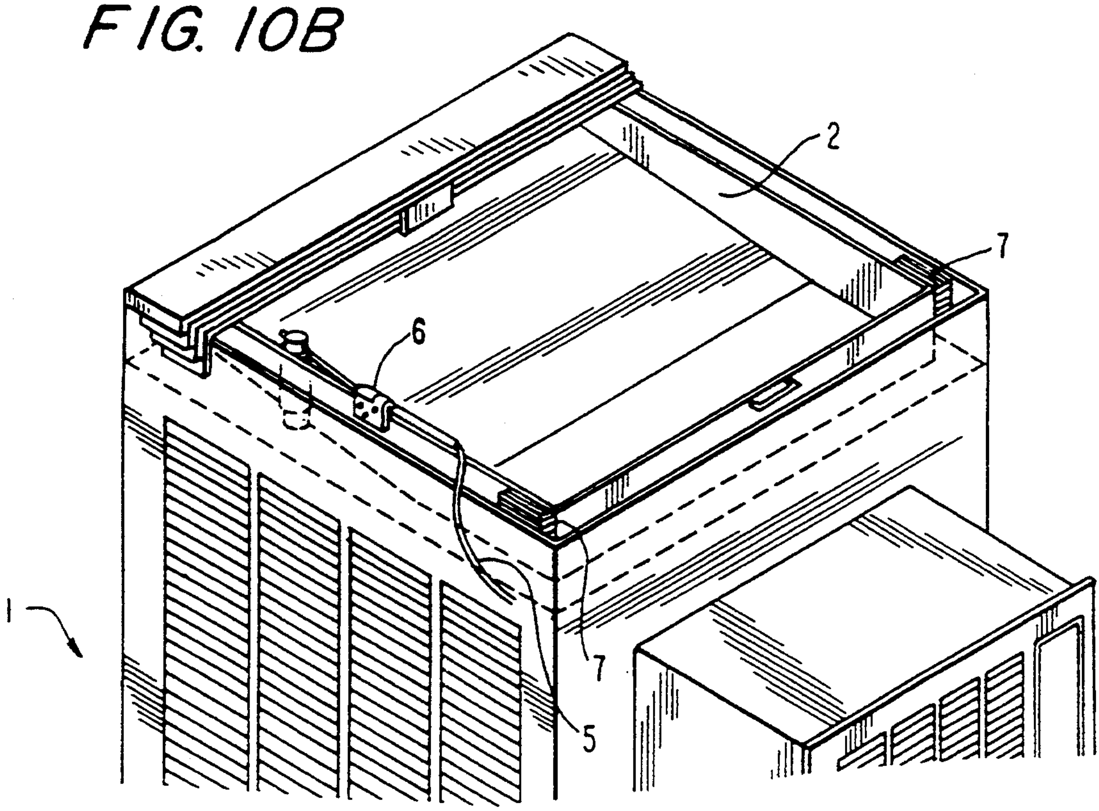
FIG. 10B shows the mobile lid when it is not covering the basin.

FIGS. 8 and 9 show the effect of changing the cycle time from 2 weeks in FIG. 8 to 1 week in FIG. 9. "A" represents the salt content in the cooler as a multiple of the total salt intake per week. It can be seen in FIG. 8 that five 2-week cycles are represented. $AM,_{max}$ levels off at 3.0 after ten weeks, with $A_{min}$ levelling off at 1.0. By decreasing the cycle time to one week (FIG. 9) a substantial reduction in salt content A is realized. Thus, ten 1-week cycles are shown in which $AM,_{Max}$ levels off at 1.5 and $A_{min.}$ levels off at 0.5.

By way of further illustration, the following table shows the salt content $A_{Max}$ and $A_{min}$ reached at steady-state during each cycle as functions of the volume fraction $V_f$ (and expressed as multiples of the salt intake, X):

| $V_f$ | $A_{Max}$ | $A_{min}$ |
|---|---|---|
| 0.25 | 4X | 3X |
| 0.33 | 3X | 2X |
| 0.5 | 2X | X |
| 0.67 | 1.5X | 0.5X |
| 0.75 | 1.3X | 0.3X |

As clearly shown in this table, increasing the volume fraction of salty water removed from the cooler reservoir per cycle will markedly reduce the value of $A_{Max}$ and hence reduces the overall salt concentration in the cooler reservoir.

The drying basin should be designed on the basis that the cooler operates continuously through the day, i.e. the salt precipitation is continuous. If the cooler is used for certain periods a day or intermittent days, the precipitating quantity will be much less. Therefore, the quantity of water evaporating from the basin should be reduced so that the interval between each time the valve is opened to fill the basin should be longer. To realize this, a part of the basin should be shaded and if the cooler operates less hours, a major part of the basin should be shaded in order to reduce the evaporation. Shading can be done by a moveable cover mounted on the external sides surmounting the basin so that the cover will not affect the basin movement.

An air conditioner can be designed with a smaller water reservoir in order to reduce water consumption during the operation of disposing of the salts together with a larger drying basin and with more drawing times to increase the salts dilution to the extent of fresh water.

To protect the drying basin from the air currents, plates (4) should be made to represent a continuity to the cooler frame and to surround the basin to conceal it. Such plates are to be fixed with the basin when installing the cooler so that its existence will not affect the transport expenses and to facilitate the stacking of coolers. The drying basin could be fitted with a pipe for draining excess water resulting from the gathering of rain water to outside the cooler from the rear side.

This invention allows the possibility of making drying units to be mounted on any evaporative air conditioner to dispose of salts. FIG. (7) shows types of drying basins with different shapes that could be mounted on any air conditioner and which could be fixed on the cooler surface by hinges or axes that move around the drying basin allowing easy dismantling and installing of the basin for cleaning purposes. It should be noted that all the materials used in making the drying basin should preferably be resistant to atmospheric factors and not affected by salts.

A drying basin can also be designed with two valves. The second valve is designed to close when the first valve opens and vice-versa. The water that supplies the cooler reservoir passes through the second valve and thus it stops supplying the cooler with water during the process of filling the drying basin to prevent diluting salty water in the cooler reservoir until the basin becomes full.

The drying basin concept disclosed herein can be utilized in any industrial application wherein it is desireable to maintain highly corrosive dissolved/suspended matter below a threshhold concentration above which they exhibit damaging properties. This allows process equipment to be constructed of less expensive materials or to require less maintenance since only the drying basin is exposed to the salt or other corrosive contaminant in a high enough concentration to be harmful. The drying basin, of course, can be constructed of more expensive corrosion resistant materials, if desired, or can be maintained at lower cost than the main system which it is designed to protect.

The foregoing description of the preferred embodiments has been provide by way of example and not by way of limitation, the intent being that the invention shall be limited solely as defined in the following claims.

I claim:

1. An evaporative air conditioner of the type including an evaporative cooler and a cooler reservoir, the improvement comprising:

a. means for disposing of salty water which normally accumulates in increasing concentration within the cooler reservoir, said disposal means including a drying basin in a location remote from the cooler reservoir, the drying basin being exposed to sun and air so that salty water from the cooler reservoir will evaporate therein; and b. flow control means for periodically refilling the drying basin with salty water from the cooler reservoir when the salty water from a previous filling has substantially evaporated.

2. The evaporative air conditioner of claim 1 wherein the drying basin, when full of salty water from the cooler reservoir has a center of gravity which is offset from its center of gravity when not filled, the drying basin being hingedly mounted along an axis which is located with respect to the drying basin's respective centers of gravity so that the drying basin when full is rotated about the axis into a full position, and wherein said flow control means includes a shut-off valve which closes when the drying basin tips into its full position.

3. The evaporative air conditioner of claim 2, further comprising a frame enclosing the air conditioner and the drying basin, and means for releasably mounting said drying basin on said frame so that the drying basin can be disengaged periodically for removal of accumulated salts.

4. The evaporative air conditioner of claim 3, wherein the drying basin further comprises wind driven fin means for eliminating a salt crust that would otherwise form on the surface of the salty water contained within the drying basin.

5. The evaporative air conditioner of claim 1, wherein the flow control means includes a shut-off valve for interrupting the flow of salty water from the cooler reservoir to the drying basin and further includes level control means for closing the shut-off valve when the drying basin is full and for closing the shut-off valve when there is a substantial change in the salty water level within the drying basin.

6. The evaporative air conditioner of claim 1, wherein the flow controller comprises a small pump for pumping salty water from the cooler reservoir to the drying basin and a floating electric switch for operating the pump in response to the level of salty water in the drying basin.

7. The evaporative air conditioner of claim 1, wherein the drying basin is equipped with a mobile lid for controlling the rate of evaporation from the drying basin by covering some area of the drying basin in inverse relation to the operation hours of the evaporative air conditioner.

8. The evaporative air conditioner of claim 3, further comprising means for adjusting the location of the mount in relation to the center of gravity of the drying basin.

9. The evaporative air conditioner of claim 1, the improvement further comprising a replacement cooler reservoir of smaller capacity than the existing reservoir for reducing water consumption during the salt disposal operation, and wherein the drying basin is sized and the refilling frequent enough to increase the salt dilution within the cooler reservoir to the extent of tap water.

10. A salt removal system for retrofit on an evaporative air conditioner of the type including an evaporative cooler and a cooler reservoir, the salt removal system comprising:

a. means for disposing of salty water which normally accumulates in increasing concentration within the cooler reservoir, said disposal means including a drying basin in a location remote from the cooler reservoir, the drying basin being exposed to sun and air so that salty water from the cooler reservoir will evaporate therein; and b. flow control means for periodically refilling the drying basin with salty water from the cooler reservoir when the salty water from a previous filling has substantially evaporated.

11. The salt removal system of claim 10, wherein the drying basin, when full of salty water from the cooler reservoir has a center of gravity which is offset from its center of gravity when not filled, the drying basin being hingedly mounted along an axis which is located with respect to the drying basin's respective centers of gravity so that the drying basin when full is rotated about the axis into a full position, and wherein said flow control means includes a shut-off valve which closes when the drying basin tips into its full position.

12. The salt removal system of claim 11, further comprising a frame enclosing the the drying basin, and means for releasably mounting said drying basin on said frame so that the drying basin can be disengaged periodically for removal of accumulated salts.

13. The salt removal system of claim 12, wherein the drying basin further comprises wind driven fin means for eliminating a salt crust that would otherwise form on the surface of the salty water contained within the drying basin.

14. The salt removal system of claim 10, wherein the flow control means includes a shut-off valve for interrupting the flow of salty water from the cooler reservoir to the drying basin and further includes level control means for closing the shut-off valve when the drying basin is full and for closing the shut-off valve when there is a substantial change in the salty water level within the drying basin.

15. The salt removal system of claim 10, wherein the flow controller comprises a small pump for pumping salty water from the cooler reservoir to the drying basin and a floating electric switch for operating the pump in response to the level of salty water in the drying basin.

16. The salt removal system of claim 10, wherein the drying basin is equipped with a mobile lid for controlling the rate of evaporation from the drying basin by covering some area of the drying basin in inverse relation to the operation hours of the evaporative air conditioner.

17. The salt removal system of claim 12, further comprising means for adjusting the location of the mount in relation to the center of gravity of the drying basin.

18. The salt removal system of claim 10, the improvement further comprising a replacement cooler reservoir of smaller capacity than the existing reservoir for reducing water consumption during the salt disposal operation, and wherein the drying basin is sized and the refilling frequent enough to increase the salt dilution within the cooler reservoir to the extent of tap water.

* * * * *